(12) United States Patent
Roberts

(10) Patent No.: US 6,427,192 B1
(45) Date of Patent: Jul. 30, 2002

(54) METHOD AND APPARATUS FOR CACHING VICTIMIZED BRANCH PREDICTIONS

(75) Inventor: James S. Roberts, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/157,647

(22) Filed: Sep. 21, 1998

(51) Int. Cl.$^7$ .............................. G06F 12/02; G06F 9/14
(52) U.S. Cl. ...................... 711/133; 711/128; 712/237; 712/239
(58) Field of Search ................................ 711/133, 128, 711/118, 122, 129; 712/233, 234, 237, 238, 239, 240, 37, 38, 39, 40

(56) References Cited

U.S. PATENT DOCUMENTS

| | | | | |
|---|---|---|---|---|
| 5,237,666 A | * | 8/1993 | Suzuki et al. | 395/375 |
| 5,317,718 A | * | 5/1994 | Jouppi | 711/137 |
| 5,687,338 A | | 11/1997 | Boggs et al. | 712/205 |
| 5,737,750 A | * | 4/1998 | Kumar et al. | 711/129 |
| 5,822,575 A | * | 10/1998 | Tran | 712/239 |
| 5,822,755 A | * | 10/1998 | Shippy | 711/118 |
| 5,870,599 A | * | 2/1999 | Hinton et al. | 712/239 |
| 5,944,815 A | * | 8/1999 | Witt | 712/207 |
| 5,954,816 A | * | 9/1999 | Tran et al. | 712/239 |
| 6,119,222 A | | 9/2000 | Shiell et al. | 712/238 |

FOREIGN PATENT DOCUMENTS

| | | | |
|---|---|---|---|
| EP | 0798632 | * | 10/1997 |
| WO | 00/08551 | | 2/2000 |

OTHER PUBLICATIONS

Steinman et al., "The AlphaServer 4100 Cached Processor Module Architecture and Design," Digital Technical Journal, Apr. 1997, pp. 1–22.

* cited by examiner

Primary Examiner—Matthew Kim
Assistant Examiner—Brian R. Peugh
(74) Attorney, Agent, or Firm—Conley, Rose & Tayon, PC; B. Noël Kivlin

(57) ABSTRACT

A microprocessor capable of caching victimized branch prediction information is disclosed. Branch prediction information is generated as branch instructions are executed over time. This prediction information is stored in a branch target buffer. The storage locations within the branch target buffer correspond to cache line locations within the microprocessor's instructions cache. Instead of discarding branch prediction information corresponding to instructions that are replaced or discarded from the instruction cache, the branch prediction information is stored in a victim branch prediction cache. Address information may also be stored to identify which instructions the prediction information corresponds to. The microprocessor's instruction cache is configured to receive and store instruction bytes, and the branch target array is coupled to the instruction cache and configured to store branch target information corresponding to the stored instruction bytes. The branch target array is configured to output the stored branch target information to the victim branch prediction cache when the corresponding instruction bytes are no longer stored in the instruction cache. The victim branch prediction cache may be located within the microprocessor, in an external level two cache, or in a separate stand alone memory. Different schemes for generating the branch prediction information may be used. A computer system and method for caching victimized branch prediction information are also disclosed.

9 Claims, 8 Drawing Sheets

| Address Tag | Branch Target Address | Taken/ Not Taken Selector |
|---|---|---|
| 62 | 64 | 66 |

Fig. 4A

| Address Tag | Branch Target Address | Taken/ Not Taken Selector | Strength |
|---|---|---|---|
| 62 | 64 | 66 | 68 |

Fig. 4B

| Address Tag | 2-Bit Selector for each Byte | Branch Target Address #1 | Branch Target Address #2 | Strength #1 | Strength #2 | Call Bit #1 | Call Bit #2 |
|---|---|---|---|---|---|---|---|
| 62 | 70 | 72 | 74 | 76 | 78 | 80 | 82 |

Fig. 4C

METHOD AND APPARATUS FOR CACHING VICTIMIZED BRANCH PREDICTIONS

BACKGROUND OF THE INVENTION

1. Field of the Invention

This invention relates to storing branch predictions generated within a microprocessor.

2. Description of the Relevant Art

Superscalar microprocessors achieve high performance through the use of pipelining, parallel execution, and high clock rates. Pipelining is an implementation technique whereby multiple instructions are overlapped during the execution process. Parallel execution refers to the simultaneously executing multiple instructions in a clock cycle. As used herein, the term "clock cycle" refers to an interval of time during which the pipeline stages of a microprocessor perform their intended functions. At the end of a clock cycle, the resulting values are moved to the next pipeline stage.

Pipelining has several hazards associated with it. One particular hazard is stalling the pipeline due to branch instructions. When a branch instruction propagates through the pipeline, it is difficult to determine which instructions after the branch should be processed until the results of the branch instruction are know. For example, if the branch instruction is "taken", then the next instruction to be executed after the branch may be located at a particular address that is offset from the branch instruction's address. In contrast, if the branch instruction is "not taken", then the next instruction to be executed may be located at the address immediately following the branch instruction. As a result, the initial stages of the pipeline may be unable to determine which instructions should begin execution in the pipeline following the branch instruction. Thus, the pipeline may stall awaiting the results of the branch instruction.

In order to prevent the instruction pipeline from stalling, microprocessor designers may implement branch prediction schemes to provide the initial pipeline stages with a predicted result for each branch instruction. The initial stages of the pipeline speculatively execute instructions along the predicted path until the branch instruction executes and one of the following occurs: (1) the prediction is found to correct, in which case the instructions continue to execute and are no longer speculative, or (2) the prediction is found to be incorrect, in which case all pipeline stages executing instructions after the branch are flushed and the pipeline starts anew using the correct path.

Many branch predictions schemes involve storing a prediction bit indicating whether the branch instruction is taken or not taken, and a predicted target address for when the branch instruction is taken. If the prediction is determined to be incorrect upon execution of the branch instruction, then the prediction bit is updated to reflect the actual results of the branch instruction. Some microprocessors use more complex schemes for branch prediction rather a simple taken/not taken prediction. For example, a two-bit prediction scheme may be used to increase prediction accuracy when branch instructions are either taken a high percentage of the time or not taken a high percentage of the time (e.g., in a loop). In two-bit prediction schemes, a prediction must miss twice before it is changed.

While the particular algorithms for each type of branch prediction scheme may vary, all tend to store some form of historical information that is developed as each branch instruction is executed. In some configurations, separate branch prediction information is stored for each branch instruction according to its address. This type of branch prediction scheme is illustrated in FIG. 1. The hardware used to store the prediction information is typically referred to as a "branch target buffer". One potential drawback of the branch target buffer illustrated in FIG. 1, is that the number of branch predictions is limited by the size of the branch target buffer. For example, assuming the branch target buffer has storage locations sufficient to store 64 branch predictions, then upon detecting a sixty-fifth branch instruction, the buffer must begin discarding the previously generated branch prediction information to make room for new branch prediction information. The size of this type of branch target buffer may be further limited by a number of factors including the desired access speed.

Other schemes that may be capable of storing more prediction information and or having faster access times may use branch target buffers that have structures mirroring the microprocessor's instruction cache. Instruction caches are high speed memory arrays that typically reside within the microprocessor. Instruction caches are characterized as having fast access times and high data output rates when compared with the access times and output rates of other memories that are further away from the microprocessor, e.g., main system memory. Instruction caches are typically organized into a plurality of blocks or "cache lines". A cache line typically refers to the smallest amount of storage that may be allocated within the instruction cache. For example, an instruction cache may be 32 kilobytes large and may have cache lines that are 16 bytes long.

When instruction bytes are read from main system memory into the instruction cache, they are read in fixed byte-length sequences (e.g., 16 byte sequences) that typically match the cache line length. Each instruction sequence (referred to herein as a "prefetch line") is typically stored in its own cache line along with an address "tag". The address tag is a predetermined portion of the instruction sequence's address that serves to identify which instruction bytes are stored within a particular cache line.

Some cache configurations put limits on where a prefetch line having a particular address may be stored. A "fully associative" cache allows a prefetch line to be stored in any cache line within the cache. Conversely, a "direct mapped" cache forces a prefetch line to be stored in a particular location within the cache according to its address. "Set associative" caches define a set of storage locations within which a prefetch line may be stored. Which set the cache line is assigned to is a function of the prefetch line's address. These set associative caches may be visualized as two dimensional arrays with each row defining a set. The number of columns (or "ways") defines the level of associatively of the cache. For example, a cache having two columns is referred to as a two-way set-associative cache.

The overall size of an instruction cache size is limited by a number of factors, including the process used to manufacture the microprocessor and die space allocated to the instruction cache. Typically, only a small portion of the total instructions for a particular program may reside in the instruction cache at any one time. Thus, various cache management schemes are utilized to load and replace the contents of the instruction cache. The goal of these management schemes is to ensure that the instructions stored in the instruction cache at any given time are the ones most likely to be needed by the microprocessor. Thus cache lines are continually being loaded and overwritten with new instructions.

As previously noted, some branch prediction schemes use branch target buffers that mirror the microprocessor's instruction cache structure. For example, if the instruction cache is 4-way set associative with 512 sets (i.e., a 4 by 512 array), the branch target buffer may be configured into an array having the same dimensions (4 by 512) and will store one set of branch prediction information for each cache line within the instruction cache. By mirroring the instruction cache's configuration, the branch target array may be easily accessed in parallel with the instruction cache using the same portion of the requested instruction address. Thus, the branch target information corresponding to a particular cache line may be available at the same time or sooner than the instruction bytes stored within the corresponding cache line.

However, as previously noted the cache lines within the instruction cache are continually being loaded and overwritten with new instructions. Thus, under the current scheme, each time a cache line is overwritten the corresponding storage locations within the branch target buffer are also cleared or overwritten to make room for new branch prediction information corresponding to the new instructions within the cache line. If the instructions originally stored in the cache line are subsequently reloaded into the instruction cache, all of their previously generated branch prediction information is lost (i.e., "victimized") and new prediction information must once again be generated from scratch. This may be particularly disadvantageous when more elaborate branch prediction schemes are used that develop more accurate predictions each time the branch instruction executes.

Thus, a method and apparatus for preventing the loss or victimization of stored branch prediction information is desired.

SUMMARY OF THE INVENTION

The problems outlined above are in large part solved by a microprocessor capable of caching victimized branch prediction information in accordance with the present invention. Instead of discarding branch prediction information corresponding to instructions that are replaced or discarded from the instruction cache, the branch prediction information is stored in a victim branch prediction cache.

Broadly speaking, one embodiment of a microprocessor capable of caching victimized branch prediction information comprises an instruction cache, a branch target array, and a victim branch prediction cache. The instruction cache is configured to receive and store instruction bytes and is coupled to the branch target array. The branch target array is coupled to the instruction cache and is configured to store branch target information corresponding to the stored instruction bytes. The victim branch prediction cache is coupled to the branch target array and is configured to output the stored branch target information to the victim branch prediction cache when the corresponding instruction bytes are no longer stored in the instruction cache. The victim branch prediction cache is configured to receive and store the branch target information.

In one embodiment, when the original instructions are restored to the instruction cache, their corresponding branch prediction information is restored to the branch target array from the victim branch prediction cache. The branch prediction information stored may vary from one implementation to another depending upon the particular branch prediction scheme being used. In one embodiment, address information may also be stored to identify which instructions the stored prediction information corresponds to.

In another embodiment, a microprocessor capable of caching victimized branch prediction information may comprise: an instruction cache configured to receive and store instruction bytes; a branch target array coupled to the instruction cache and configured to store branch target information corresponding to the stored instruction bytes; and a victim branch prediction cache interface. The interface may be coupled to the branch target array. The branch target array is configured to output the stored branch target information to the interface when the corresponding instruction bytes are no longer stored in the instruction cache. The interface is configured to convey the branch target information received from the branch target array to a victim branch prediction cache that is external to the microprocessor.

A method for storing victimized branch prediction information is also contemplated. Broadly speaking, one embodiment of the method comprises storing a plurality of instruction bytes into an instruction cache. A set of branch target information corresponding to the stored instruction bytes is generated. The branch target information is then stored in a branch target array. When the instruction bytes are overwritten in the instruction cache by a second plurality of instruction bytes, the first set of branch target information is written to a victim branch prediction cache instead of being discarded. The branch information stored within the victim branch cache may be restored to the branch target array from the victim branch prediction cache when the original set of instructions is restored to the instruction cache.

A computer system capable to storing victimized branch prediction information is also contemplated. Broadly speaking, in one embodiment the computer system may comprise a main system memory, a branch victim cache, and a microprocessor. The microprocessor is coupled to the system memory and the branch victim cache. The microprocessor may comprise an instruction cache configured to store instruction bytes and a branch prediction array configured to store predicted branch target information corresponding to said stored instruction bytes. The branch prediction array may be configured to output the stored branch prediction target information to the branch victim cache when the corresponding instruction bytes are no longer stored in the instruction cache.

BRIEF DESCRIPTION OF THE DRAWINGS

Other objects and advantages of the invention will become apparent upon reading the following detailed description and upon reference to the accompanying drawings in which:

FIG. 4A is a diagram illustrating one embodiment of an entry within the victim branch prediction cache of FIG. 3.

FIG. 4B is a diagram illustrating another embodiment of an entry within the victim branch prediction cache of FIG. 3.

FIG. 4C is a diagram illustrating yet another embodiment of an entry within the victim branch prediction cache of FIG. 3.

Figure 1:
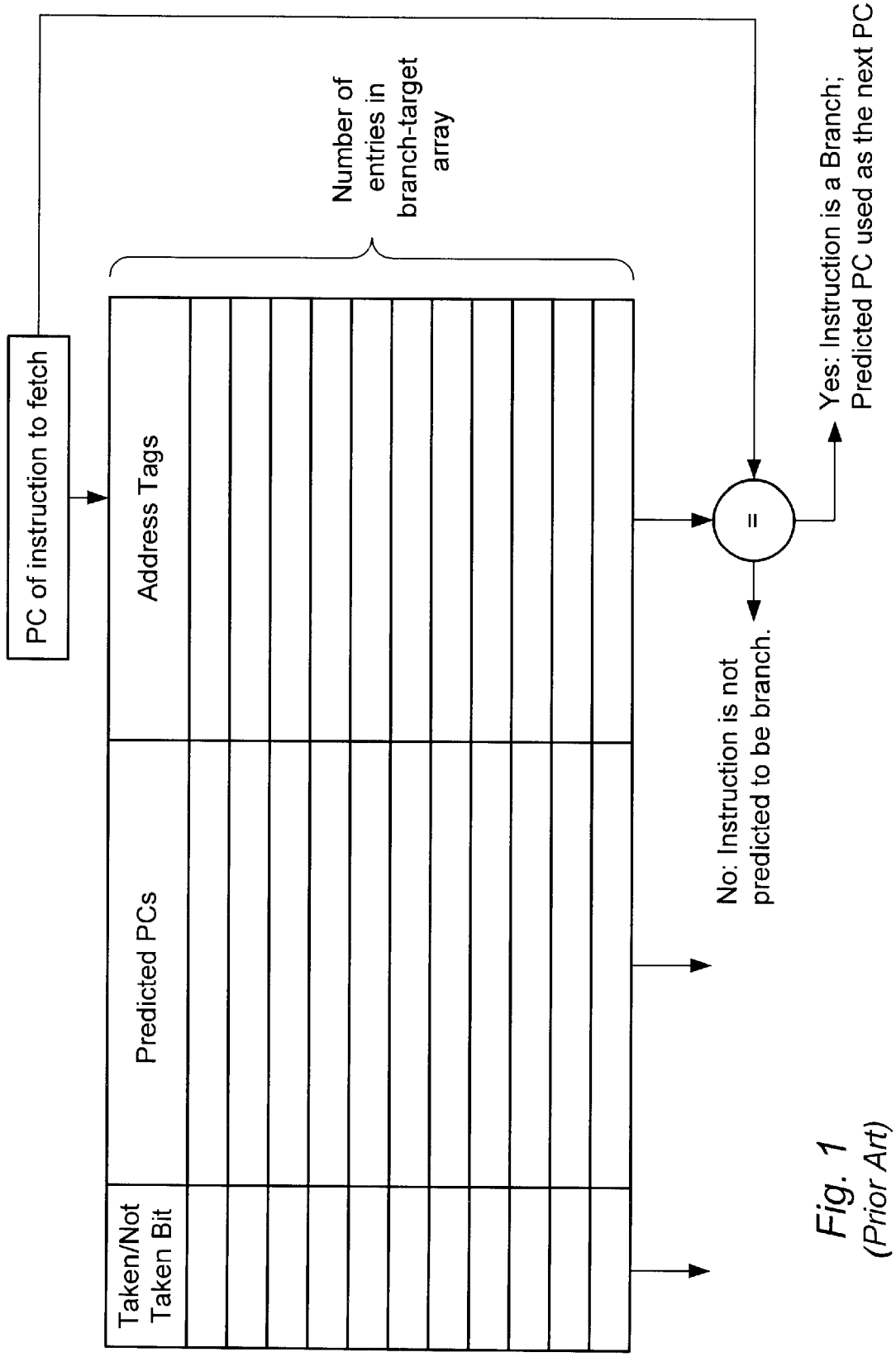
FIG. 1 is a block diagram of one type of branch target buffer.

While the present invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 2:
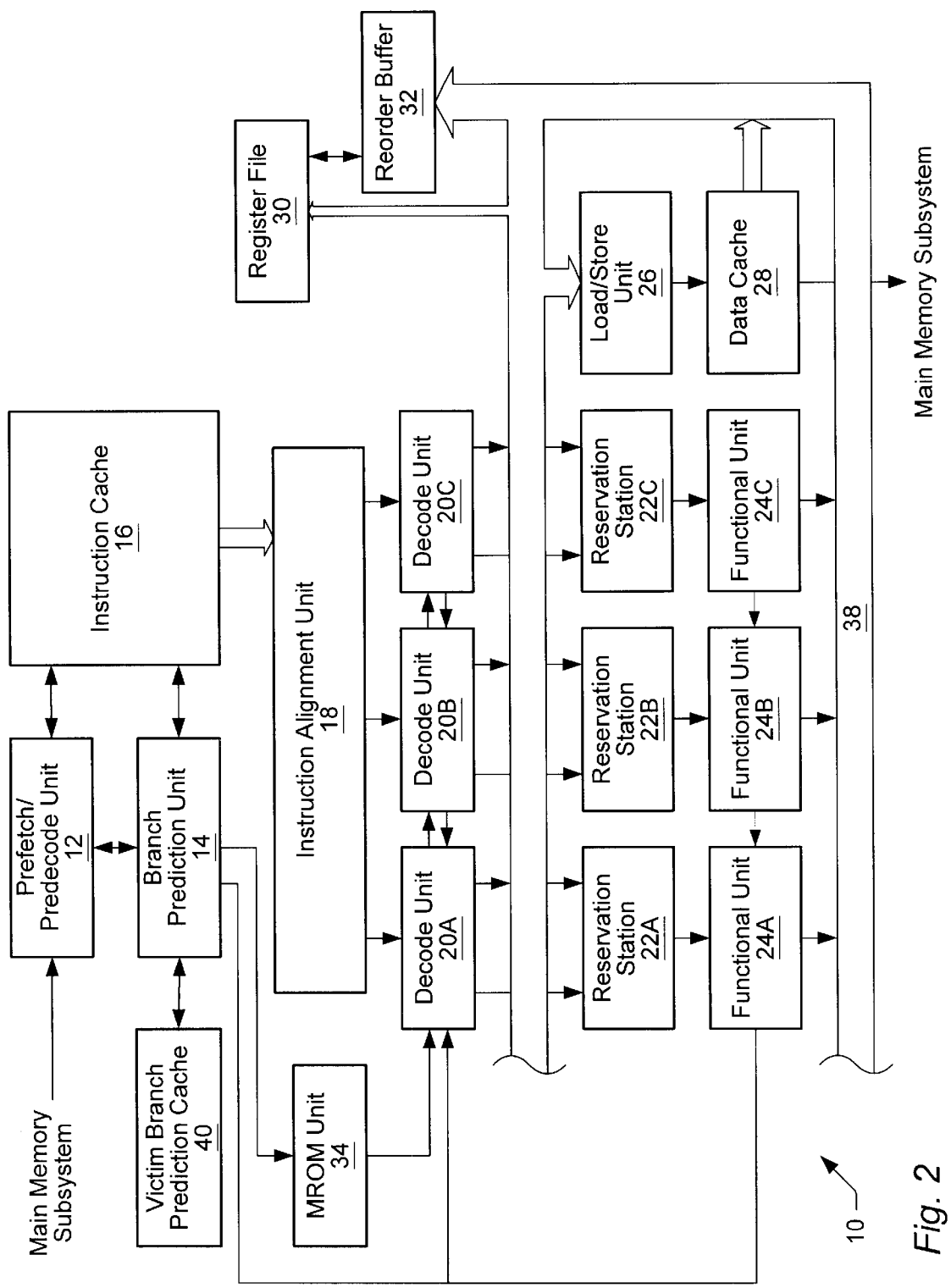
FIG. 2 is a block diagram of one embodiment of a superscalar microprocessor employing one embodiment of a victim branch prediction cache.

Turning now to FIG. 2, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, an MROM unit 34, and a victim branch prediction cache 40. Elements referred to herein with a particular reference number followed by a letter may be collectively referred to by the reference number alone. For example, decode units 20A–20C may be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16 and victim branch prediction cache 40. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. Finally, MROM unit 34 is coupled to decode units 20.

Instruction cache 16 is a high speed cache memory configured to store instructions. Instructions are fetched from instruction cache 16 and dispatched to decode units 20. In one embodiment, instruction cache 16 is configured to store up to 64 kilobytes of instructions in a 4-way set-associative structure having 32-byte lines (a byte comprises 8 binary bits). Alternatively, 2-way set-associativity may be employed as well as any other desired associativity. Instruction cache 16 may additionally employ a way prediction scheme in order to speed access times to the instruction cache. Instead of accessing tags identifying each line of instructions and comparing the tags to the fetch address to select a way, instruction cache 16 predicts the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented as a fully associative, set-associative, or direct mapped configuration.

Instructions are fetched from main memory and stored into instruction cache 16 by prefetch/predecode unit 12. Instructions may be prefetched prior to the request thereof from instruction cache 16 in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

One encoding of the predecode tags for an embodiment of microprocessor 10 employing a variable byte length instruction set will next be described. A variable byte length instruction set is an instruction set in which different instructions may occupy differing numbers of bytes. An exemplary variable byte length instruction set employed by one embodiment of microprocessor 10 is the x86 instruction set.

In the exemplary encoding, if a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an immediate byte would have start, end, and functional bits as follows:

| | |
|---|---|
| Start bits | 10000 |
| End bits | 00001 |
| Functional bits | 11000 |

According to one particular embodiment, early identification of an instruction that includes a scale-index-base (SIB) byte is advantageous for MROM unit 34. For such an embodiment, if an instruction includes at least two bytes after the opeode byte, the functional bit for the Mod R/M byte indicates the presence of an SIB byte. If the functional bit for the Mod R/M byte is set, then an SIB byte is present. Alternatively, if the functional bit for the Mod R/M byte is clear, then an SIB byte is not present.

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20.

Microprocessor 10 employs branch prediction in order to speculatively fetch instructions subsequent to conditional branch instructions. Branch prediction unit 14 is included to perform branch prediction operations. In one embodiment, up to two branch target addresses are stored with respect to each 16 byte portion of each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Decode units 20 also detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Before describing branch prediction unit 14 and its interaction with victim branch cache 40 in greater detail, other aspects regarding exemplary microprocessor 10 are disclosed.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Instructions are selected independently from each set of eight instruction bytes into preliminary issue positions. The preliminary issue positions are then merged to a set of aligned issue positions corresponding to decode units 20, such that the aligned issue positions contain the three instructions which are prior to other instructions within the preliminary issue positions in program order. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e., instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to three pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position I is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. Additionally, functional units 24 may be configured to perform address generation for load and store memory operations performed by load/store unit 26.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit waits until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set-associative structure. Similar to instruction cache 16, data cache 28 may employ a way prediction mechanism. It is understood that data cache 28 may be implemented in a variety of specific memory configurations.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Victim Branch Cache and Branch Prediction Cache

Figure 3:
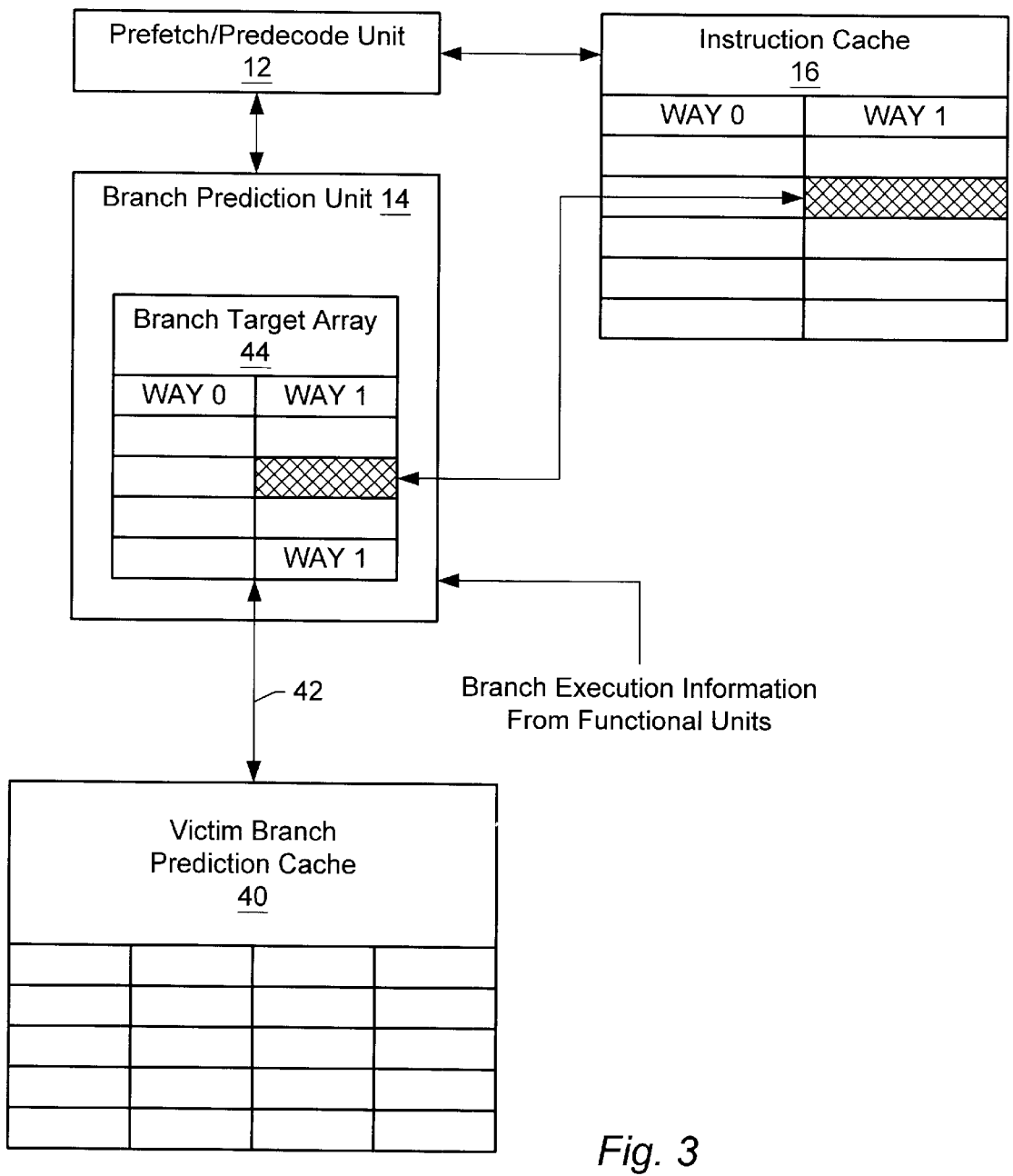
FIG. 3 is a block diagram showing details of one embodiment of the victim branch prediction cache depicted in FIG. 2.

Turning now to FIG. 3, more details of one embodiment of branch prediction unit 12 and victim branch prediction cache 40 are shown. In this embodiment, branch prediction unit 14 comprises a branch target array 44. Branch target array 44 comprises a number of storage locations that may be arranged to mirror the configuration of instruction cache 16. For example, as the embodiment in the figure illustrates, instruction cache 16 and branch target array 44 may both be configured as two-way set associative structures. Each storage location within branch target array 44 may store branch prediction information for the instructions stored in the corresponding cache line within instruction cache 16. The shaded storage locations indicate one example of the correlation between storage locations in branch target array 44 and instruction cache 16.

When instruction cache 16 is accessed with a fetch address, branch target array 44 also receives the address (or a portion thereof). Thus, both instruction cache 16 and branch target array 44 may be accessed in parallel. Branch prediction unit 14 receives branch execution information from function units 24A–C and updates branch target array 44 accordingly.

When instruction cache 16 receives a prefetch line of instruction bytes for storage, it must determine where it will store the instruction bytes. The prefetch line's address determines which set it will be stored in to, but not which particular cache line within the set. If there is an empty cache line within the set, instruction cache 16 will store the instruction bytes there. If, however, all of the cache lines within the set are full, then instruction cache 16 will replace the contents of one of the cache lines with the new instruction bytes. Accordingly, branch prediction unit 14 also replaces the stored branch prediction information within branch target array 44 that corresponds to the cache line being replaced. However, instead of merely writing over the prediction information corresponding to the old cache line, branch prediction unit 14 and branch target array 44 are configured to output the branch prediction information to victim branch prediction cache 40. Accompanying the prediction information is address information that identifies which instructions bytes the prediction information corresponds to. In some embodiments, the address information may comprise the entire address of the corresponding instruction bytes. In other embodiments, the address information may comprise only a portion of the entire address (e.g., an address tag).

Victim branch prediction cache 40, which is coupled to branch prediction unit 14 via a victim branch prediction cache interface 42, may be configured to monitor the requested addresses output to main memory by prefetch/predecode unit 12. Thus, each time a new cache line is read from memory (e.g., on a cache miss), the corresponding prediction information (if any) stored in victim branch prediction cache 40 may be read into branch target array 44. Once again, the branch prediction information is stored in the storage location within branch target array that corresponds to the cache line within instruction cache 16 that will receive the corresponding instruction bytes.

When prefetch/predecode unit conveys a requested address to main system memory, it also conveys the same address to victim branch prediction cache 40. If victim branch prediction cache 40 finds stored branch prediction information corresponding to the requested address, the branch prediction information is conveyed back to branch target array 44 for storage.

Victim branch prediction array 40 comprises a plurality of storage locations, but need not necessarily share the same structure as branch target array 44 or instruction cache 16. For example, victim branch prediction array 44 may be direct mapped or 4-way set associative while instruction cache 16 and branch target array 44 may be 2-way set associative. Victim branch prediction array 40 may be located in a number of different locations, as explained in greater detail below. Similarly, victim branch prediction cache interface 42 may be contained completely within microprocessor 10 or it may extend outside microprocessor 10 (either alone or as part of another bus).

Turning now to FIG. 4A, more details of one embodiment of an entry in victim branch prediction cache 40 are shown. In this embodiment, each entry comprises an address tag 62, a branch target address 64, and a taken/not taken selector 66. As previously noted, address tag 62 may comprise all or just a portion of the address of the corresponding instruction bytes. Branch target address 64 comprises the predicted address to which a branch instruction within the corresponding cache line will jump. Since this embodiment stores only one branch target address 64 per cache line, this embodiment may be better suited to implementations with smaller cache lines. Smaller cache lines may lower the probability that more than one branch instruction will be located within a single cache line. If more than one branch instruction is located within the cache line, the predictions may be less accurate because the prediction information for one branch instruction might be replaced with the prediction information for a second branch instruction. Taken/not taken selector 66 may comprise a single bit that indicates whether the corresponding branch instruction is predicted to be taken or not taken. If the branch instruction is predicted to be taken, then the branch target address is used as the program counter for the instruction following the branch instruction. If the branch instruction is predicted to be not taken, then the branch target address is ignored and the next sequential instruction is fetched.

When a branch prediction is determined to be incorrect, the corresponding information stored within branch target array 44 is updated. For example, if a branch is predicted to be taken and functional units 22A–C determine the branch instruction is not taken, then taken/not taken selector 66 may be toggled accordingly. Similarly, if a predicted branch target address is incorrect, the correct address is stored over the incorrect address.

Note that other information may be stored in an entry in addition to or in place of the information shown in the figure. For example, in one embodiment offsets may be stored in lieu of branch target addresses. Further note that the structure of entries in branch target array 44 may contain the same or less prediction information as may be stored in branch prediction unit 14.

Turning now to FIG. 4B, details of a second embodiment of an entry in victim branch prediction cache 40 are shown. In this embodiment, a strength field 68 is added to the entry to further increase the accuracy of the prediction. In many instances, a branch instruction will be taken a number of times before it is not taken (e.g., in a "for" or "do" loop). Similarly, in other instances a branch instruction may be not taken a number of times before it is taken. Thus a two-bit prediction scheme using both taken/not taken selector 66 and strength field 68 may be implemented.

Turning now to FIG. 4C, details of a third embodiment of an entry in victim branch prediction cache 40 are shown. In this embodiment, 2-bit selectors 70, and a second branch target address 74 and call bits 80 and 82 are added to the prediction information stored in the entry 40. In this embodiment, a 2-bit selector field 70 is stored for each byte within the instruction cache line. The lower four of the fetch address are used to select one of these bit pairs, which are then interpreted according to Table 1.

TABLE 1

| Bit Value | Selection |
| --- | --- |
| 00 | sequential |
| 01 | use branch target 1 |
| 10 | use branch target 2 |
| 11 | use return stack |

Thus, each byte in the associated cache line may have prediction information attributed to it, and each byte may have one of the four prediction values in the table. Advantageously, this implementation provides prediction information for more than one branch instruction per cache line. In this embodiment, a 2-bit selector having a value of "11" selects a return stack within branch prediction unit 14. The return stack is a stack-oriented (last-in first-out or "LIFO") memory that stores return address for call instructions. Similarly, call bits 80 and 82 are one bit fields use to indicate whether either of the corresponding branch target addresses 72 or 74 are associated with a call instruction. If either or both of the branch target addresses 72 and 74 are associated with a call, this bit instructs branch prediction unit 14 to place the PC (program counter) of the next address onto the return stack. Advantageously, this provides a predicted return address for call instructions within instruction cache 16.

Note, in other embodiments each entry within branch target array 44 and victim branch prediction cache 40 may correspond to only a portion of each cache line within instruction cache 16. For example, if each cache line is 32 bytes long, but each read or fetch from instruction cache 16 is only 16 bytes long, then each entry within branch target array 44 and victim branch prediction cache 40 may correspond to a "fetch line" or "window" rather than an entire cache line. As a result, additional address information may be needed to identify which window within the cache line the branch prediction entry corresponds to.

Exemplary Computer System

Figure 5:
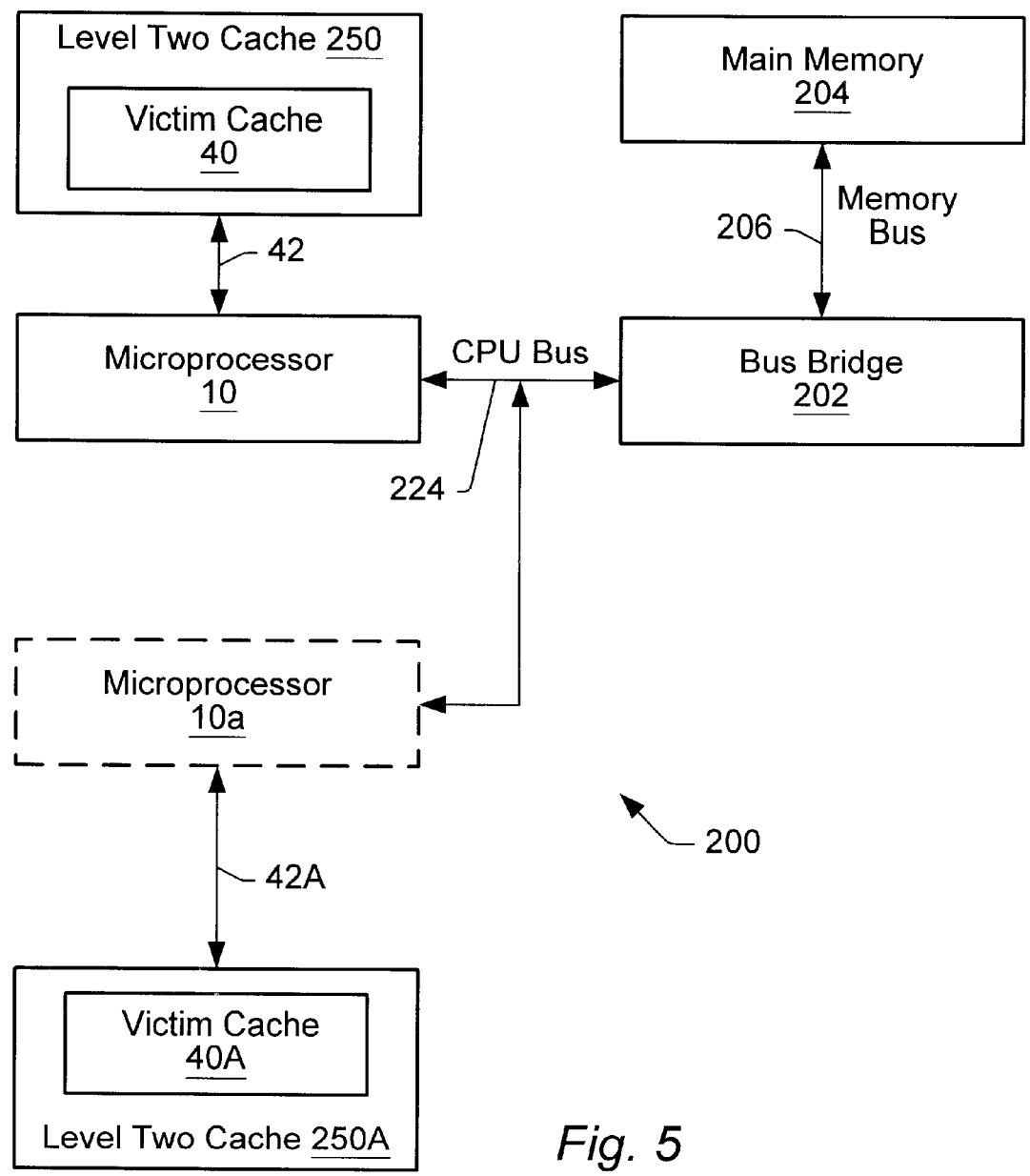
FIG. 5 is a diagram illustrating one embodiment of a computer system utilizing one embodiment of the victim branch prediction cache of FIG. 3.

Turning now to FIG. 5, one embodiment of a computer system 200 using victim cache 40 is shown. Computer system 200 comprises microprocessor 10, a level two cache 250, a bus bridge 202, and a main system memory 204. Microprocessor 10 is coupled to bus bridge 202 via CPU bus 224. Main memory is coupled to bus bridge 202 via memory bus 206. Further details and additional embodiments of computer system 200 will be discussed below.

While the previous figures illustrated victim branch prediction cache 40 as part of microprocessor 10, victim branch prediction cache 40 may also be implemented as part of a level two cache 250 external to microprocessor 10. Level two cache 250 may be static random access memory (SRAM), synchronous dynamic access memory (DRAM) or any other type of memory characterized with short access times and high data throughput. Victim branch prediction cache interface 42 may share lines with the bus used by microprocessor 10 to communicate with level two cache 250, or it may be a separate bus.

As the figure illustrates, computer system 200 may be a single or multiple-processor system. In a multiple processor configuration, microprocessor 10 is joined by one or more additional microprocessors 10A. Each additional microprocessor 10A may have its own level two cache 250A with its own victim branch prediction cache 40A (and possibly its own victim branch prediction cache interface 42A). The level two caches may be coupled to the microprocessors in a backside configuration using a dedicated high speed bus. In other embodiments of computer system 200, microprocessors 10–10A may share a single level two cache 250 and a single victim branch prediction cache 40.

Figure 6:
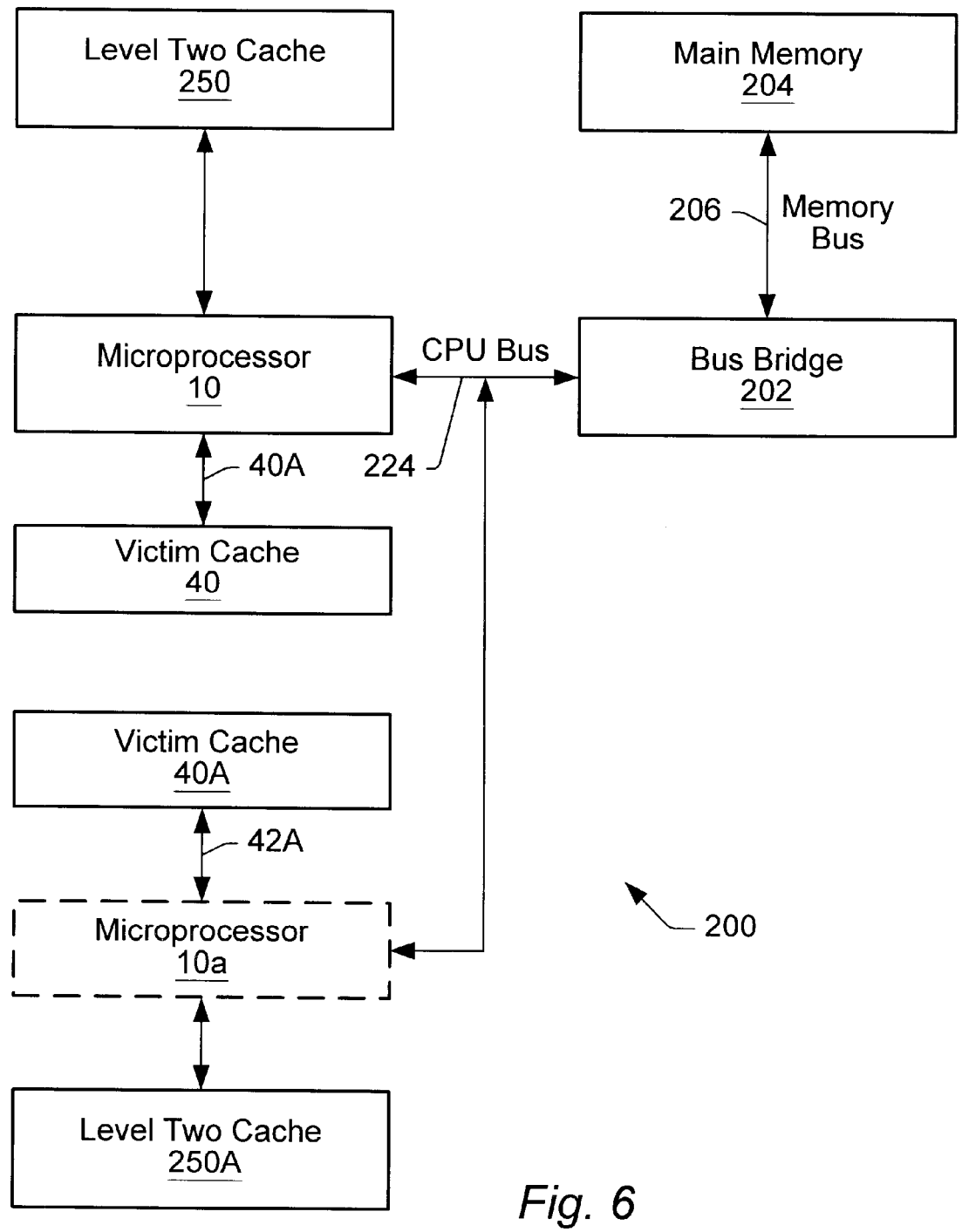
FIG. 6 is a diagram illustrating another embodiment of a computer system utilizing one embodiment of the victim branch prediction cache of FIG. 3.

Turning now to FIG. 6, another embodiment of computer system 200 is shown. In this embodiment of computer system 200, victim branch prediction cache 40 is implemented external to microprocessor 10 and level two cache 250. Victim branch prediction cache 40 may be coupled to microprocessor 10 via a dedicated bus 42. Once again, computer system 200 may be configured as a single or multiple processor system, wherein each microprocessor has its own dedicated victim branch prediction cache 40.

Figure 7:
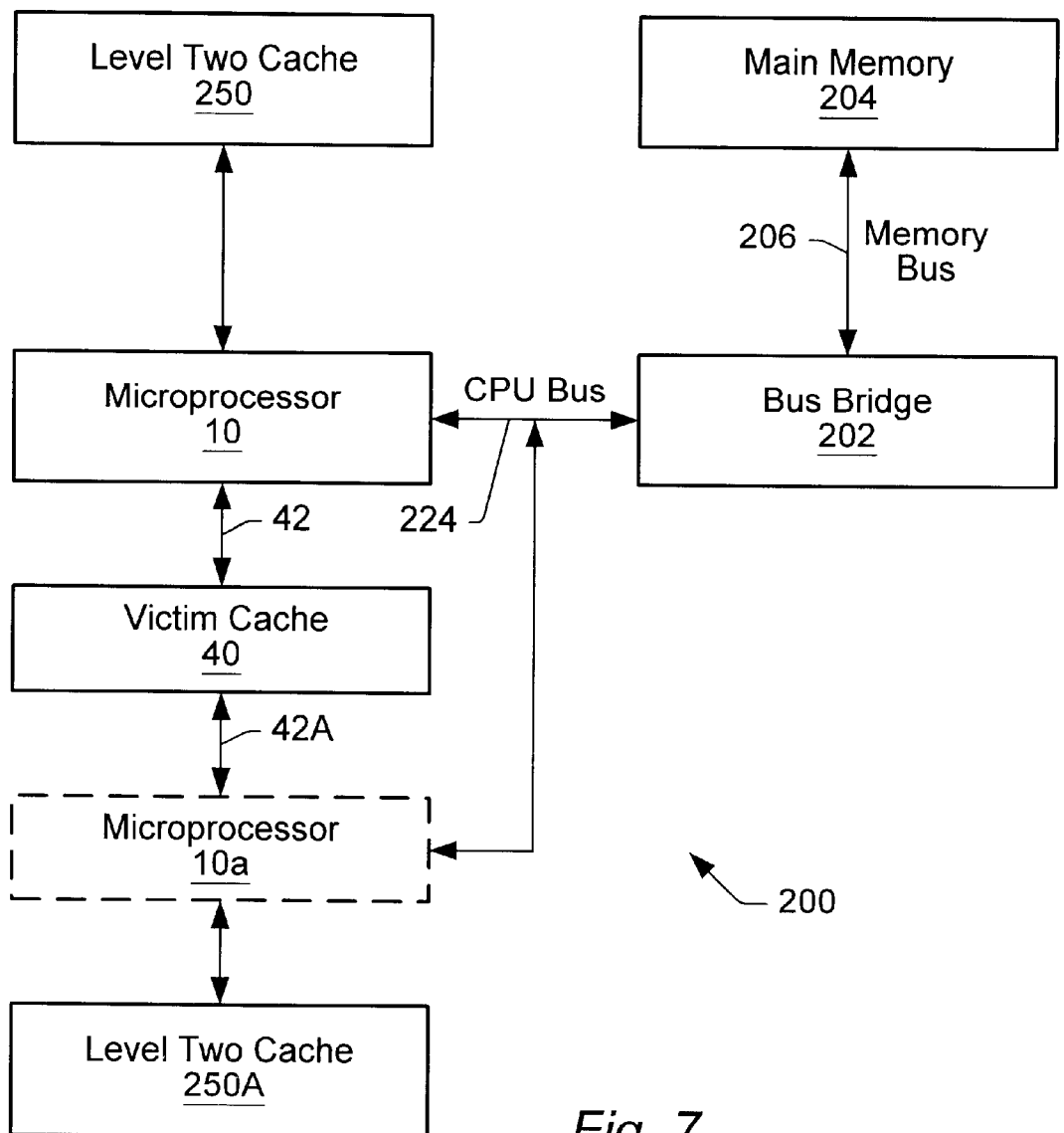
FIG. 7 is a diagram illustrating yet another embodiment of a computer system utilizing one embodiment of the victim branch prediction cache of FIG. 3.

Turning now to FIG. 7, yet another embodiment of computer system 200 is shown. In this embodiment, however, microprocessors 10 and 10A share a single victim branch prediction cache that is implemented external to both microprocessors 10 and 10A and their level two caches 250 and 250A. In this embodiment, victim branch prediction cache 40 may be have two read ports and two write ports to allow simultaneous access for both microprocessors 10 and 10A. In other embodiments, additional microprocessors may be added to computer system 200 and victim branch prediction cache 40 may have additional read and write ports or multiplexing logic to limit the number of simultaneous accesses.

Figure 8:
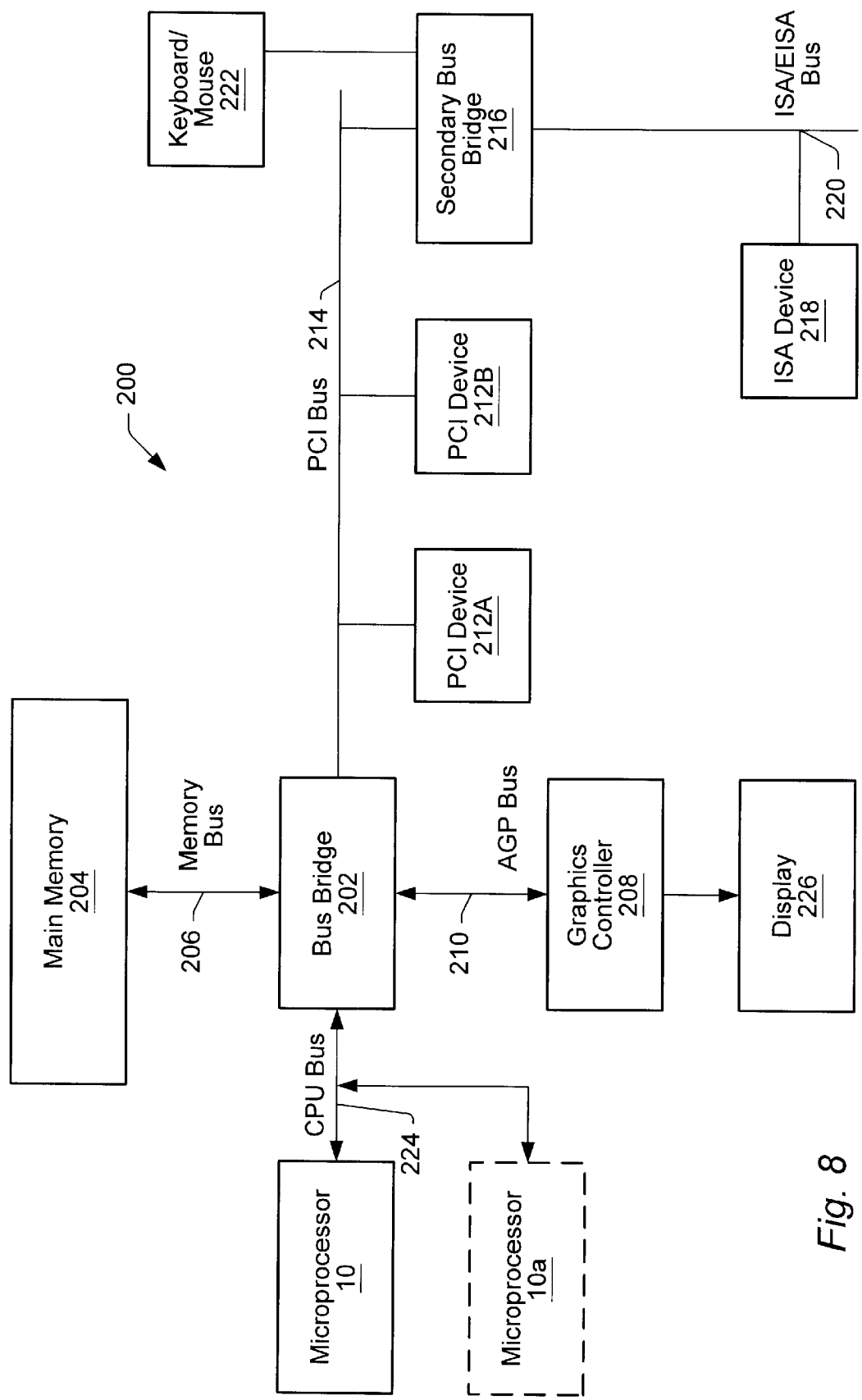
FIG. 8 is a diagram illustrating other details of one embodiment of the computer systems from FIGS. 5–7.

Turning now to FIG. 8, a block diagram illustrating additional components that may be used in different embodiments of computer system 200 is shown. Computer system 200 is coupled to a variety of system components through a bus bridge 202 as shown. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Microprocessor 10 is coupled to bus bridge 202 through a CPU bus 224.

Bus bridge 202 provides an interface between microprocessor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. For example, in one embodiment, secondary bus bridge 216 includes a master PCI arbiter (not shown) for arbitrating ownership of PCI bus 214. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to CPU bus 224 between microprocessor 10 and bus bridge 202 in other embodiments. Alternatively, the external cache may be coupled to bus bridge 202 and cache control logic for the external cache may be integrated into bus bridge 202.

Main memory 204 is a memory in which application programs are stored and from which microprocessor 10 primarily executes. A suitable main memory 204 comprises DRAM (Dynamic Random Access Memory), and preferably a plurality of banks of SDRAM (Synchronous DRAM).

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional microprocessors (e.g. microprocessor 10A shown as an optional component of computer system 200). Microprocessor 10A may be similar to microprocessor 10. More particularly, microprocessor 10A may be an identical copy of microprocessor 10. Microprocessor 10A may share CPU bus 224 with microprocessor 10 (as shown in FIG. 5) or may be connected to bus bridge 202 via an independent bus.

What is claimed is:

1. A microprocessor comprising:
   an instruction cache configure to receive and store instruction bytes;
   a branch target array coupled to said instruction cache and configured to store branch target information corresponding to said stored instruction bytes; and
   a victim branch prediction cache coupled to said branch target array, wherein said branch target array is configured to output said stored branch target information to said victim branch prediction cache in response to said corresponding instruction bytes being overwritten in said institution cache, and wherein said victim branch prediction cache is configured to store said branch target information received from said branch target array and convey said stored branch target information hack to said branch target array in response to said corresponding instruction bytes once again being stored in said instruction cache, and wherein said branch target information comprises at least an address tag, two or more branch target addresses, two or more taken/not bits, and strength information for each branch target address.

2. A microprocessor comprising:
   an instruction cache configured to receive and store instruction bytes;
   a branch target array coupled to said instruction cache and configured to store branch target information corresponding to said stored instruction bytes; and
   a victim branch prediction cache interface coupled to said branch target array, wherein said branch target array interface is configured to output said stored branch target information to said victim branch prediction cache interface when said corresponding instruction bytes are no longer stored in said instruction cache, and wherein said victim branch prediction cache interface is configured to convey said branch target information received from said branch target array to a victim branch prediction cache outside of said microprocessor;
   wherein said branch target array is further configured to output address information to the victim branch prediction cache through said victim branch prediction interface, wherein said address information identifies which instruction bytes correspond to branch target information;
   wherein said branch target information comprises an address tag, two branch target addresses, two taken/not bits, and strength information for each branch target address.

3. A method for managing branch prediction information comprising:
   storing a first cache line including a plurality of instruction bytes into an instruction cache;
   generating a first set of branch target information corresponding to a first portion of the plurality of stored instruction bytes;
   storing the first set of branch target information in a first entry in a branch target array;

generating a second set of branch target information corresponding to a second portion of the plurality of stored instruction bytes;

storing the second set of branch target information in a second entry in the branch target array; and writing the first set and the second set of branch target information to a victim branch prediction cache when the first cache line is overwritten in the instruction cache by a second cache line.

4. The method as recited in claim 3, further comprising:

generating a third set of branch target information corresponding to the second cache line, and storing the third set of branch target information in the first entry in the branch target array.

5. The method as recited in claim 4, further comprising:

copying the first set and the second set of branch target information from the victim branch prediction cache back to the branch target array when the first plurality of instruction bytes are restored into the instruction cache.

6. The method as recited in claim 5, wherein said writing further comprises storing address information in the victim branch prediction cache, wherein the address information identifies which plurality of instructions a respective set of branch target information is associated with.

7. The method as recited in claim 6, further comprising checking the address information stored in the victim branch prediction cache when instructions are written into the instruction cache, wherein said checking determines whether branch target information corresponding to the instructions being written is stored in the victim branch prediction cache.

8. A microprocessor comprising:

an instruction cache configured to receive and store instruction bytes;

a branch target array coupled to said instruction cache and configured to store branch target information corresponding to said stored instruction bytes; and a victim branch prediction cache interface coupled to said branch target array, wherein said branch target array is configured to output said stored branch target information to said victim branch prediction cache interface in response to detection that said corresponding instruction bytes are being overwritten or are about to be overwritten in said instruction cache, and wherein said victim branch prediction cache interface is configured to convey said branch target information received from said branch target array to a victim branch prediction cache outside of said processor;

wherein said branch target information comprises at least an address tag, two branch target addresses, two taken/not bits, and strength information for one or more of the branch target addresses.

9. A microprocessor comprising:

an instruction cache configured to receive and store instruction bytes as a plurality of cache lines, wherein the instruction cache is configured to store a first cache line;

a branch target array coupled to said instruction cache and configured to store branch target information corresponding to said stored instruction bytes, wherein each entry in said branch target array stores branch target information for fewer than all of the instruction bytes in a given cache line in said instruction cache, wherein a plurality of entries in said branch target array are associated with said first cache line; and a victim branch prediction cache interface coupled to said branch target array, wherein said branch target array is configured to output the plurality of entries to said victim branch prediction cache interface when said first cache line is no longer stored in said instruction cache; and a victim branch prediction cache coupled to said victim branch prediction cache interface, wherein said victim branch prediction cache is configured to store said plurality of entries conveyed by the victim branch prediction interface.

* * * * *

UNITED STATES PATENT AND TRADEMARK OFFICE
CERTIFICATE OF CORRECTION

PATENT NO.    : 6,427,192 B1                                          Page 1 of 1
DATED         : July 30, 2002
INVENTOR(S)   : James S. Roberts It is certified that error appears in the above-identified patent and that said Letters Patent is hereby corrected as shown below:

Column 16,
Line 10, please change "configure" to -- configured --.

Signed and Sealed this

Eleventh Day of February, 2003

JAMES E. ROGAN
*Director of the United States Patent and Trademark Office*